(12) United States Patent
Alexander et al.

(10) Patent No.: US 6,942,394 B2
(45) Date of Patent: Sep. 13, 2005

(54) BEARING RACE SUPPORT WITHOUT DISTORTION

(75) Inventors: John Vernon Alexander, Mesa, AZ (US); Daniel Alan Nyhus, Payson, AZ (US); Richard Soloski, Mesa, AZ (US)

(73) Assignee: The Boeing Company, Chicago, IL (US)

(*) Notice: Subject to any disclaimer, the term of this patent is extended or adjusted under 35 U.S.C. 154(b) by 192 days.

(21) Appl. No.: 10/326,340

(22) Filed: Dec. 20, 2002

(65) Prior Publication Data

US 2005/0152630 A1 Jul. 14, 2005

(51) Int. Cl.$^7$ ................. F16C 43/00; F16C 43/04; B25G 3/00; F16B 27/00; F16D 3/52
(52) U.S. Cl. ................. 384/585; 384/537; 384/559; 384/581; 384/584; 411/84; 403/343; 464/81
(58) Field of Search ............... 384/585, 513, 384/514, 515, 517, 518, 537, 539, 563, 564, 384/581, 582, 584; 411/84, 87, 88; 403/343, 403/408.1; 464/160, 81, 83, 85, 23

(56) References Cited

U.S. PATENT DOCUMENTS

| | | | |
|---|---|---|---|
| 2,879,092 A * | 3/1959 | Grobell et al. ............... 403/337 |
| 3,500,976 A * | 3/1970 | Halley ............... 192/29 |
| 4,255,946 A * | 3/1981 | Hansen ............... 464/36 |
| 4,560,364 A * | 12/1985 | Cohen ............... 464/30 |
| 5,429,465 A * | 7/1995 | Puskas ............... 411/92 |
| 5,474,499 A * | 12/1995 | Olson ............... 464/83 |
| 5,545,089 A * | 8/1996 | Kirschey ............... 464/83 |
| 5,564,903 A * | 10/1996 | Eccles et al. ............... 416/174 |
| 5,588,916 A * | 12/1996 | Moore ............... 464/20 |
| 5,749,031 A * | 5/1998 | Miwa et al. ............... 399/228 |
| 5,772,514 A * | 6/1998 | Moore ............... 464/20 |
| 5,906,476 A * | 5/1999 | Arlton ............... 416/114 |
| 6,511,120 B1 * | 1/2003 | Mitts ............... 296/202 |

* cited by examiner

*Primary Examiner*—David A. Bucci
*Assistant Examiner*—Colby Hansen
(74) *Attorney, Agent, or Firm*—Thompson Coburn LLP

(57) ABSTRACT

A race for a bearing, which is mountable to a mount, has an annular bearing surface with a center axis defining an axis of rotation for the bearing and mutually perpendicular radial and transverse directions relative thereto. The race also has a radial wall that is adapted for mounting the race to the mount in a manner such that a bearing transfer load is transferred between the mount and the race in the transverse direction and the race bearing surface maintains its substantially annular shape independently of a load applied to the mount causing distortion of the mount when the race is mounted to the mount and the mount is loaded.

16 Claims, 7 Drawing Sheets

BEARING RACE SUPPORT WITHOUT DISTORTION

STATEMENT REGARDING FEDERALLY SPONSORED RESEARCH AND DEVELOPMENT

This invention was developed pursuant to U.S. Government Contract MDA972-98-9-0009 between The Boeing Company and Defense Advanced Research Projects Agency (DARPA).

BACKGROUND OF THE INVENTION (1) Field of the Invention

The present invention pertains to a bearing race for a bearing and a mount or support for the bearing. More specifically, the invention pertains to an improved design for a bearing race which maintains its annular bearing surface when it is mounted to a mount and the mount is subjected to a load which causes distortion of the mount. The manner in which the race is connected to the mount prevents the distortion of the mount from being transferred from the mount to the race when the mount is loaded and distorted.

(2) Description of the Related Art

Roller bearings are known in the art and provide an effective means for controlling rotary motion of one object relative to another. Bearings of this type are effective in controlling rotary motion about an axis of rotation. Typically, the roller bearing comprises an outer race and an inner race with a plurality of rollers positioned between the races in rolling contact with the races. Generally, a cage is used to maintain the rollers in a fixed orientation between the races and in rolling contact with the races. In a typical installation of the roller bearing, one of the races is mounted to a journal of a rotating object, for instance, a spindle, and the other of the races is mounted to a fixed object, such as a housing for the spindle. In this way, the rotary motion of the one object may be transferred to the race such that the race and the rotating object rotate through the action of the rollers in a controlled manner relative to the other of the races and the stationary object.

As the rollers of the bearing and the surfaces upon which they roll are critical to ensuring proper operation of the bearing, it is essential that the bearing surfaces and the rollers have tightly controlled dimensions and shapes, including diameter size, roundness, cylindricity, etc. Additionally, it is critical that there be minimal circular run out between the races. Over time, even small imperfections and deviations in the rollers and the bearing surfaces can cause excessive and accelerated wear of the bearing leading to premature failure of the bearing.

Conventional bearings are well suited for applications where there is rotary motion between a shaft and a stationary object. Typically, the races are fixedly attached to their mounts or supports and the mounts are not subjected to external loads which would cause excessive distortion of the mount or support. In applications where there are excessive forces, typically the size of the bearing is increased to compensate for the force and to provide a more rigid connection. However, in applications where size must be constrained and the mounts are subjected to external loads which cause the mounts to distort, a larger bearing cannot be used and the distortion of the mount transfers directly to the race thereby deforming the bearing surface and causing the bearing to fail prematurely.

In the application giving rise to the invention disclosed herein, the roller bearing is an inboard pitch bearing provided in the rotor hub of a helicopter. In this application, the roller bearing provides a rotational hinge about which the helicopter blade pitch is changed. The rotor hub assembly is subjected to an extreme amount of centrifugal force developed from the rotor blades as they rotate to generate lift for the helicopter, and as the rotor hub retains the blades in place under the centrifugal force in which the blades operate, there is distortion of the blade supporting members, including the mounts and supports for the inboard pitch bearing. Designs which have used a conventional roller bearing in this application have had problems because the high centrifugal forces developed by the rotor blades distort the inboard pitch bearing mounts causing deformation of the inboard pitch bearing race and premature failure of the inboard pitch bearing.

Thus, what is needed is a bearing race which is capable of transferring a bearing transfer load to its mount or receiving the bearing transfer load from its mount while the bearing surface or the race maintains its annular shape independently of an external load applied to the mount which distorts the mount. Such a bearing race and mount would be of relatively simple construction and have relatively few parts so that manufacturing, inventory and installation costs associated with the bearing and the mount could be kept to a minimum. Such a race and mount would be part of a compact and lightweight assembly, thereby meeting the stringent space and weight limitations and other constraints dictated by the application.

SUMMARY OF THE INVENTION

The present invention overcomes the disadvantages of the prior art by providing a bearing race which is capable of maintaining its annular bearing surface in an annular shape when it is mounted to a mount and the mount is loaded and distorted. The bearing race and mount are designed to prevent the distortion of the mount from being transferred to the race while at the same time allowing bearing transfer loads to be transferred between the mount and the race. The present invention provides for a compact and lightweight design for the bearing race and the bearing race support or mount, and a relatively simple construction and method of manufacture and assembly.

Among the aspects of the present invention is a combination of a race for a bearing and a mount for the bearing race. The bearing race of the combination comprises an annular bearing surface and a wall extending radially from the bearing surface. The bearing race wall is adapted to engage with the mount for mounting the bearing race to the mount. The combination has engaging components that transfer a bearing transfer load between the mount and the race while allowing relative movement of the bearing race and the mount in a radial direction under a distorting load applied to the mount.

In one aspect of the invention, the radial wall comprises a plurality of slots on the radial wall that extend in both the radial and transverse directions, and the slots are formed to cooperate with a plurality of bosses formed on the mount when the race is mounted to the mount. Preferably, the radial wall slots are formed to have a tight fit with the mount bosses in the transverse direction and a loose fit with the mount bosses in the radial direction.

Among other aspects of the present invention is the provision of a combination comprising a race for a bearing and a mount for the race. The race of the combination comprises an annular bearing surface and a radial wall extending from the annular bearing surface adapted for mounting the race to the mount. The bearing race radial wall and the mount each have complementing portions of engaging components for mounting the race to the mount in a manner such that a bearing transfer load is transferred between the mount and the race while the race bearing surface maintains its substantially annular shape independently of any load applied to the mount tending to cause distortion of the mount.

In another aspect of the present invention, a combination of a bearing race and a mount is provided for rotatably mounting a rotating member. The rotating member is adapted to rotate about an axis perpendicular to the bearing axis, and rotation of the rotating member about the perpendicular axis creates a centrifugal force which causes a load to be applied to the mount tending to distort the mount. The bearing race of the combination comprises an annular bearing surface and a wall extending radially from the bearing surface. The wall is adapted to engage with the mount for mounting the bearing race to the mount. The combination has engaging components that are adapted to transfer a bearing transfer load between the mount and the race. The engaging components allow relative movement of the bearing race and the mount in a radial direction under the centrifugal force load.

The present invention provides for a compact design for a bearing and its mount which is lightweight and capable of maintaining its annular shape when the mount or support is subjected to extreme loading. Further objects and features of the invention are revealed in the following detailed description of the preferred embodiment of the invention and in the drawings which follow.

BRIEF DESCRIPTION OF THE DRAWINGS

Corresponding reference numbers indicate corresponding parts throughout the several views of the drawings.

DETAILED DESCRIPTION OF THE PREFERRED EMBODIMENT

Figure 1:
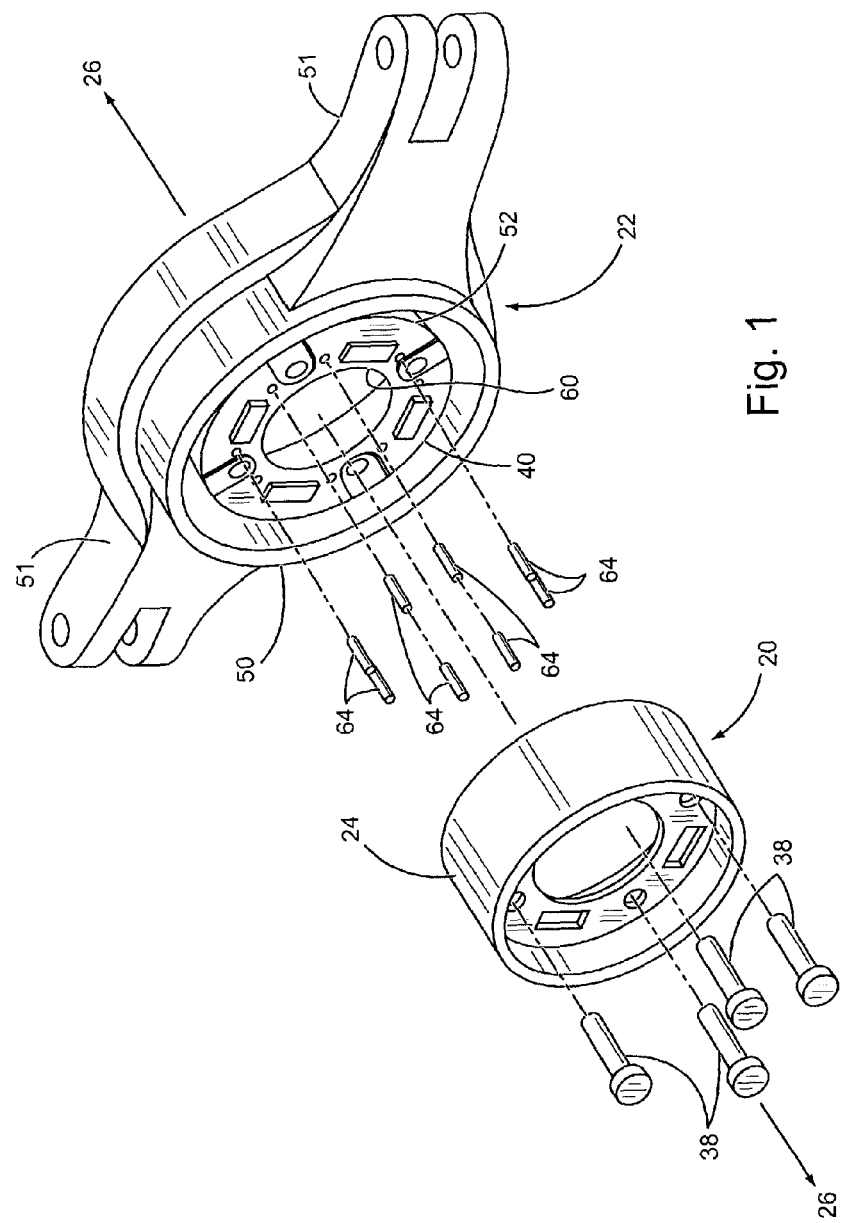
FIG. 1 is an exploded isometric view of a bearing race and a mount of the present invention.

FIG. 1 shows an exploded view of a bearing race 20 and a mount 22 of the present invention. In the configuration shown in the drawing figures and described herein, the subject bearing race 20 is used in a cylindrical roller bearing, and the other parts of the bearing are not essential to the disclosure and have been omitted to simplify the discussion herein. As shown in FIG. 1, the race 20 has an outer diameter surface which forms a bearing surface 24 for an inner race of the bearing. This outer diameter surface 24 of the bearing race may be adapted for rolling contact with rollers of the bearing or it may be adapted for rotational sliding contact with a low friction element made from a material such as carbon or polytetrafluoroethylene (PTFE). The outer diameter surface 24 may also be adapted to receive a separate bearing race, either integral to the bearing assembly or removable from the bearing assembly. For example, the outer diameter bearing surface may be formed to engage an inner diameter of a conventional bearing. Thus, is this sense the race of the present invention would function as an adapter to allow mounting of a conventional bearing to a mount. Further, the separate bearing race may be a race for a roller bearing, tapered roller bearing, thrust bearing, ball bearing, sliding bearing, etc. The surface treatment and material of the bearing race and bearing surface are not important to the disclosure herein and may be of materials commonly known in the art.

Figure 8:
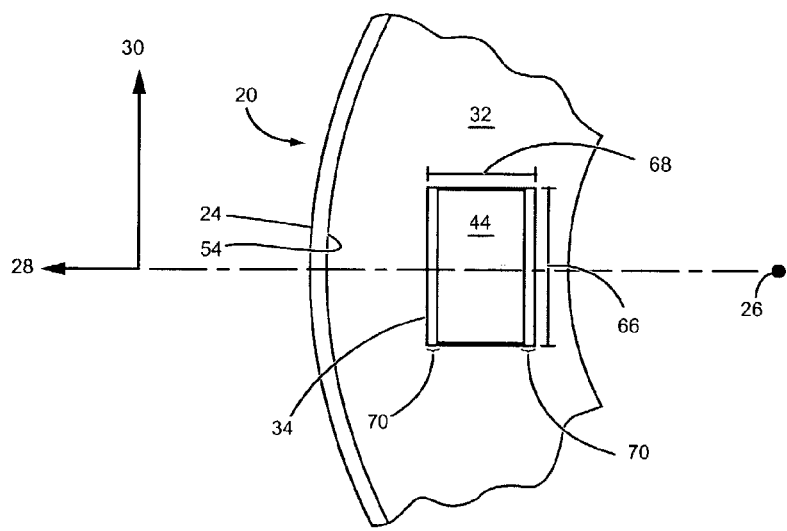
FIG. 8 is a partial enlarged view of the race and the mount in detail area 8 of FIG. 5 showing the slot of the race and the mount of the boss.

In the arrangement shown in FIG. 1, the bearing race 20 has a center axis 26 which defines an axis of rotation for the bearing. Mutually perpendicular radial and tangential or transverse directions 28, 30 are defined for each position away from the axis 26 (FIG. 8). In the arrangement shown in the drawing figures, the race 20 and the mount 22 rotate about the center axis 26. However, it should be appreciated that the mount and race may be stationary relative to the center axis depending upon the application. Additionally, although the bearing race shown herein has a bearing surface 24 which is cylindrical, or in other words, a bearing surface which extends axially about the center axis 26, it should be understood that by using the principles of the invention described herein, the bearing race may also be used as part of an annular face bearing where the bearing surface extends radially about the center axis. Additionally, although the bearing race shown herein functions as the inner race of a bearing, it should be appreciated that the race may be formed as the outer race for a bearing utilizing the principles of the invention described herein.

Figure 2:
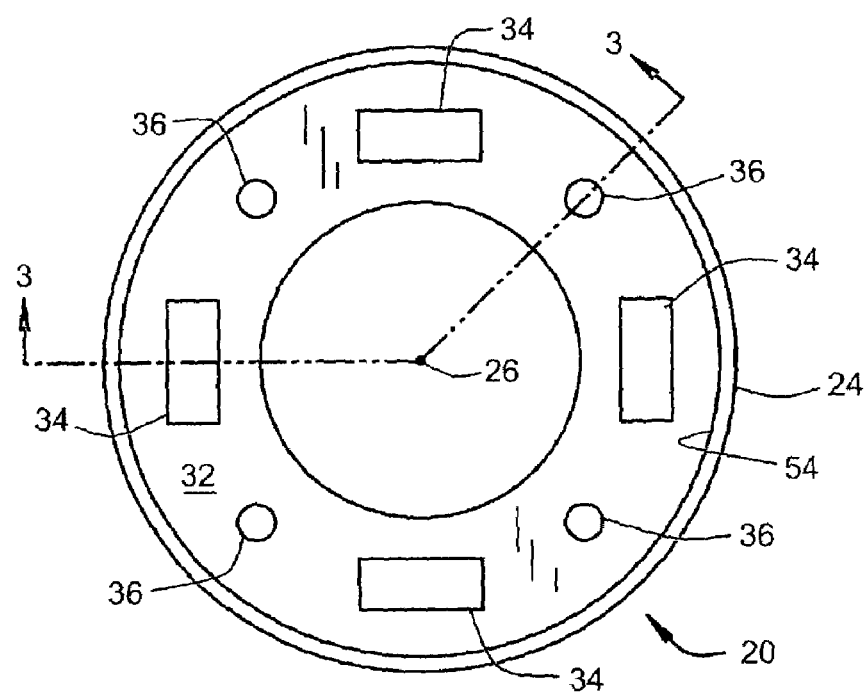
FIG. 2 is an end view of the bearing race of FIG. 1.
Figure 3:
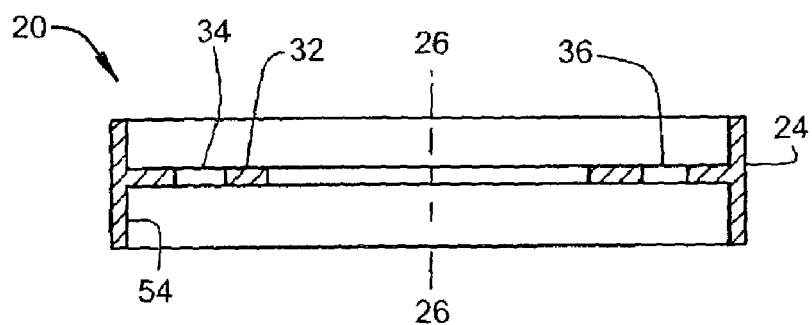
FIG. 3 is a cross-sectional view of the bearing race along lines 3—3 of FIG. 2.

Referring to FIGS. 2 and 3, the bearing race 20 is preferably a cylindrical member having its bearing surface 24 on the outer diameter of the race. A radial wall 32 preferably extends inward from the bearing surface to allow mounting of the race to the mount. It should be appreciated that the bearing surface for the race may be formed on the inner diameter surface of the race, and also, the radial wall may be formed to extend radially outward from the bearing surface depending upon the application (i.e., an inner or outer race) and the desired method of mounting the bearing to the mount. Preferably, to minimize distortion of the race 20 and the bearing surface 24, the radial wall 32 is centered relative to the bearing surface (FIG. 3).

The radial wall 32 is provided with a plurality of slots 34, which are contained within the radial wall. As shown in FIG. 2, the slots 34 are in a rectangular configuration such that they extend in both the radial and transverse directions 28, 30 (FIG. 8), and the slots are preferably equiangularly spaced about the center axis 26. The radial wall 32 of the race is also provided with fastener holes 36 which extend through the radial wall. The fastener holes 36 may also be equiangularly spaced about the radial wall and have an alternating pattern with the slots 34. Mechanical fasteners 38 may be directed through the fastener holes 36 to provide axial positioning for the race on the mount. The arrangement of the fastener 38 in the race fastener hole 36 will be described later with reference to FIG. 9.

Figure 4:
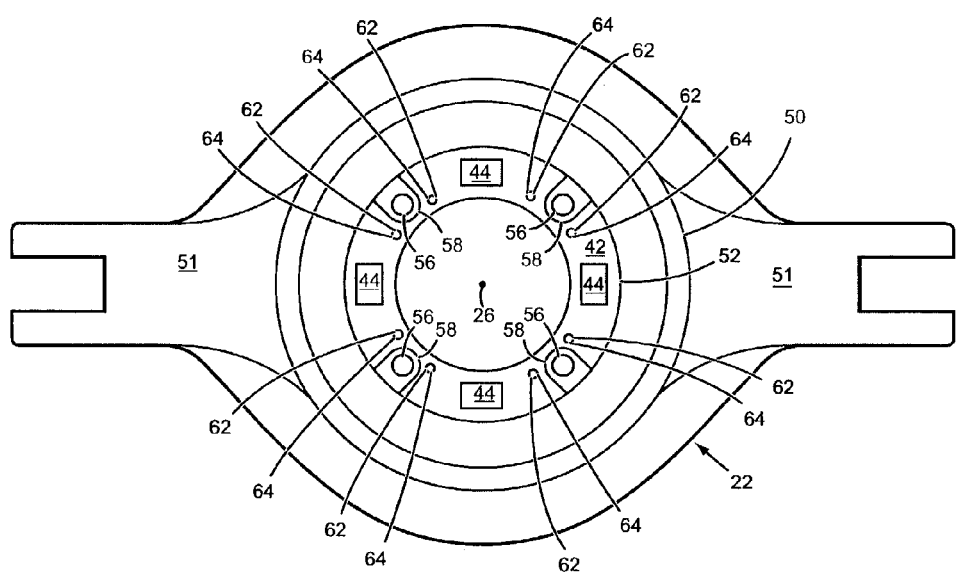
FIG. 4 is an end view of the mount of FIG. 1.

Referring to FIG. 4, the mount 22 of the present invention is shown as a generally cylindrical member having a center hub 40 with a circular end surface 42 on which bosses 44 are preferably formed in an equiangular pattern on the circular end surface. Preferably, the bosses 44 are rectangular in shape and extend in both the radial and transverse directions 28, 30 (FIG. 8) relative to the bearing race center axis 26. Each of the bosses 44 may be formed with an undercut on its included corner with the circular end surface 42 to prevent the race 20 from becoming bound on the corner between the boss and the circular end surface. In FIG. 4, the mount 22 is shown with a hollow center through the hub 40, which allows a spindle and other components (not shown) related to the functioning of the subject bearing and mount to pass through the center of the bearing. However, depending upon the application, the mount may be solid.

In the present invention, the mount 22 has an outer rim 50 which is spaced from the center hub 40 a distance sufficient to accommodate the race 20 and the other components of the bearing, i.e., the rotational elements, the outer race, and the outer race mount (not shown). Lugs 51 are attached to the outer rim, and in the application herein, the lugs are used to hold the helicopter rotor blades (not shown) to the hub assembly (not shown). The mount center hub 40 has an outer diameter 52 which is sized to provide clearance with an inner diameter 54 of the race.

Figure 9:
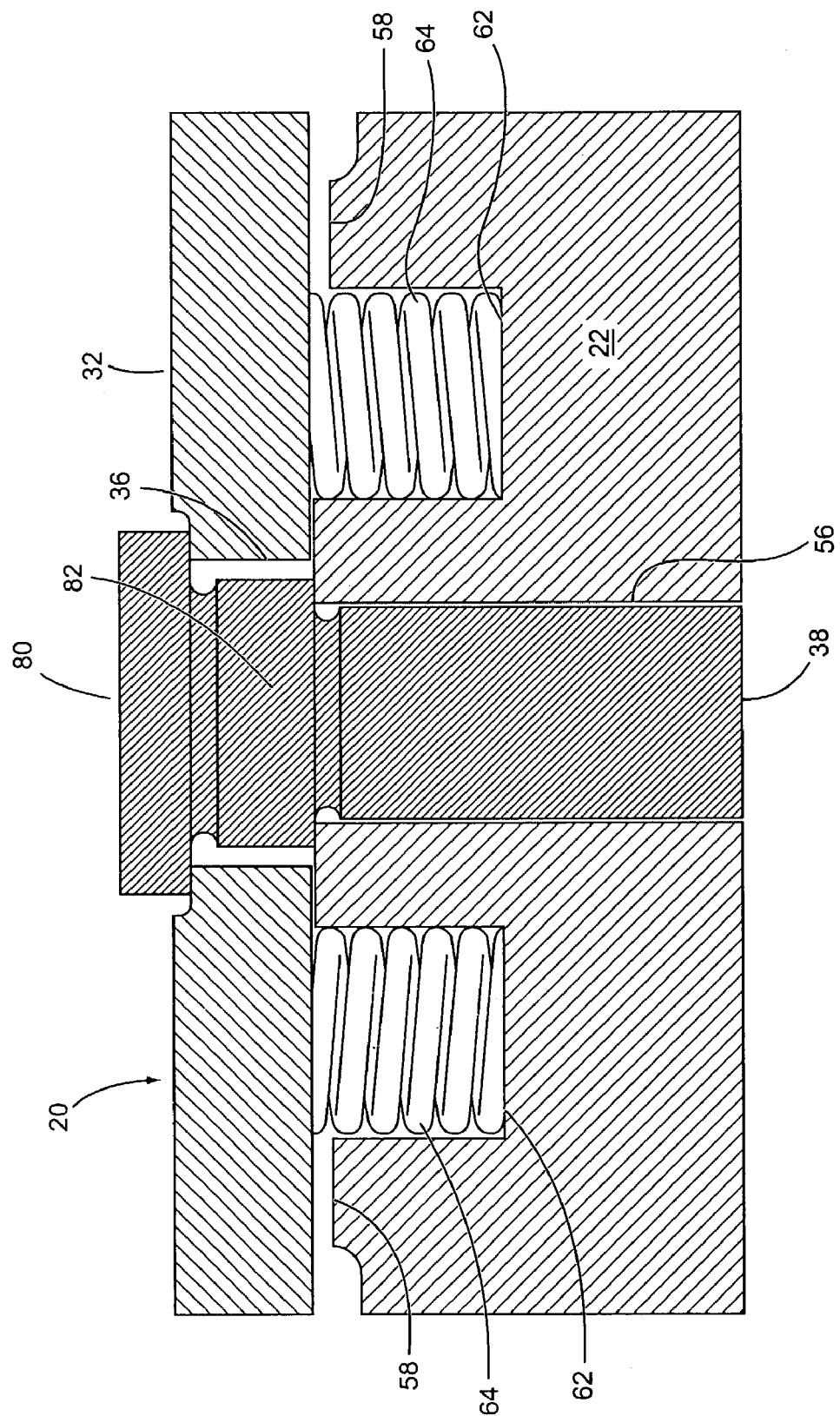
FIG. 9 is a partial cross-sectional view of the race and the mount taken along lines 9—9 of FIG. 5 showing detail of a fastener in a fastener hole of the race and the mount.

The center hub 40 is preferably provided with fastener holes 56 which align with the fastener holes 36 on the race. Accordingly, for the present invention, the mount bosses 44 and the mount fastener holes 56 have an alternating pattern on the circular end surface 42 which complements the alternating pattern of the slots 34 and the race fastener holes 36 on the race radial wall 32. Around each of the mount fastener holes 56 is a raised surface or boss 58 which extends axially outward from the circular end surface 42. The mount fastener hole boss 58 is arranged on the circular end surface in a manner to minimize the amount of distortion that may be transferred from the mount to the race when the mount is loaded. Additionally, the mount fastener hole boss 58 has an axial height which is less than the mount boss 44 thereby allowing the mount bosses to engage the race slots 34 while providing relative positioning for the race radial wall 32 above the hub circular end surface 42. As shown in FIG. 9, the axial height of the mount fastener hole boss 58 is sufficiently above the circular end surface 42 to prevent interference of the circular end surface with the race radial wall when the race is mounted on the mount.

On the circular end surface 42 on each side of the mount fastener hole boss 58, a compression spring locator hole 62 is provided (FIG. 4, FIG. 9). The compression spring locator hole 62 partially receives and holds a compression spring 64 in place between the race 20 and the mount 22, and the compression spring biases the race radial wall 32 axially away from the circular end surface 42 (FIG. 9), as will be explained later. Further, the springs 64 help reduce any vibrations that may be transferred between the mount and the race. It should be appreciated that other forms of springs may also be used in place of the compression springs, such as tension springs, torsion springs, or leaf springs, etc.

Figure 5:
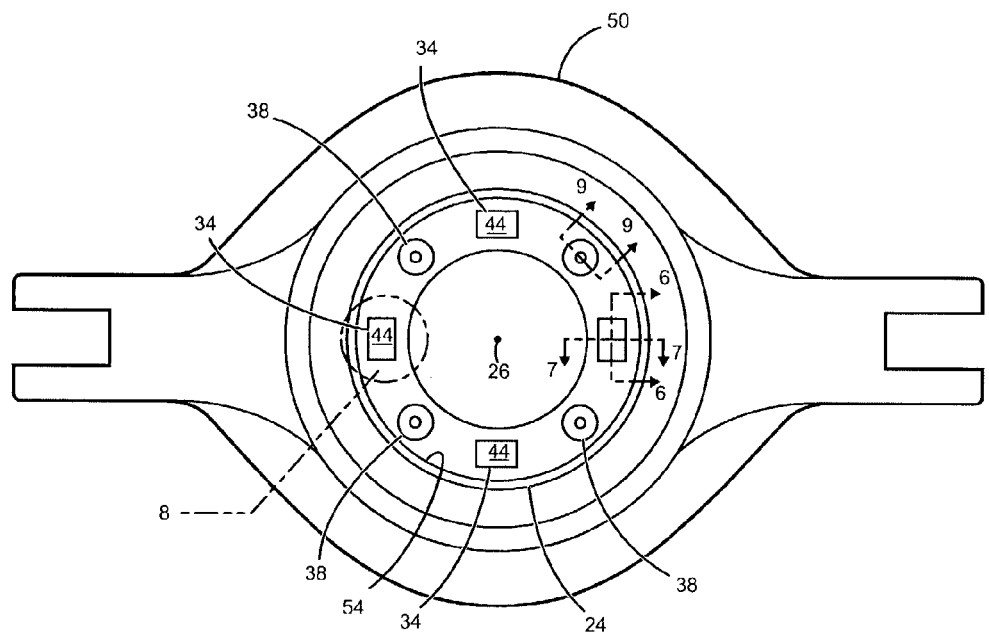
FIG. 5 is an end view of the race and the mount of FIG. 1 assembled together.

Referring to FIG. 5, the race 20 is shown assembled on the mount 22. The mount bosses 44 are aligned with the race slots 34 and the mechanical fasteners 38 are directed through the fastener holes 36, 56 on the race and the mount. As shown in FIG. 9, the mechanical fasteners 38 pass through the race and the mount to another object (not shown); however, the mechanical fasteners 38 may also be threaded directly into the fastener holes of the mount. When assembling the race 20 to the mount 22, the compression springs 64 are preferably placed in the compression spring locator holes 62 on the hub circular end surface 42 (FIGS. 1 and 9). The race 20 is placed over the mount hub 40 with the race slots 34 aligned with the mount bosses 44, and then moved axially so that the bosses are received in the slots. The springs 64 bias the race radial wall 32 away from the hub circular end surface such that when the race is assembled to the mount and the fasteners 38 are tightened to axially support the race against the mount, the race has sufficient clearance with each mount fastener hole boss 58 (FIG. 9). As shown in FIG. 5, four point contact is used, and this arrangement has been found to be sufficient to maintain axial engagement of the race with the mount while accommodating distortion of the mount and minimizing its transfer to the race, as will be described.

Figure 6:
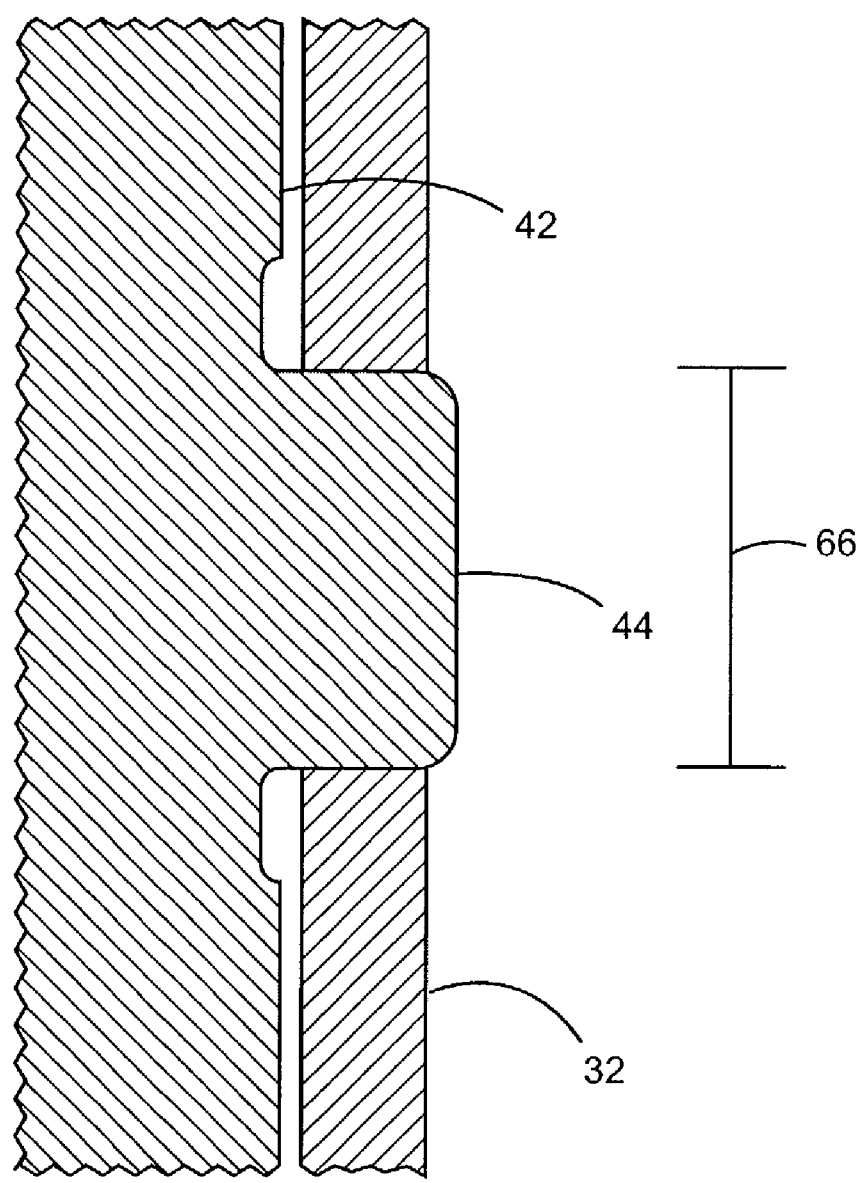
FIG. 6 is a partial cross-sectional view of the race and mount taken along lines 6—6 of FIG. 5 showing detail of a slot of the race and a boss of the mount in a relative transverse direction.
Figure 7:
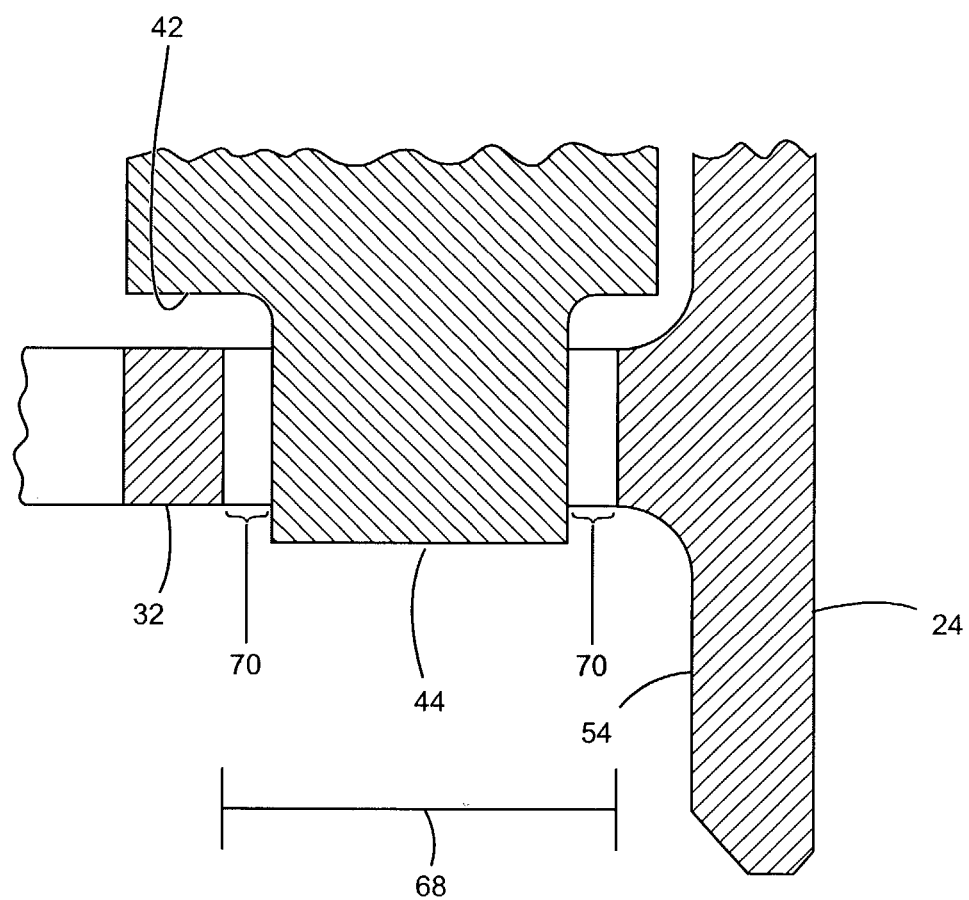
FIG. 7 is a partial cross-sectional view of the race and the mount taken along lines 7—7 of FIG. 5 showing detail of a slot of the race and a boss of the mount in a relative radial direction.

As shown in FIGS. 6 and 8, the race radial wall slot 34 is preferably formed to engage the mount boss 44 in the transverse direction 30. This allows a bearing transfer load to be transferred from the mount to the race, or vice versa, depending upon the application. Thus, a transverse dimension 66 of the slot is sized or controlled for a close sliding fit with the boss as the race is moved in the axial direction over the boss during assembly. In the radial direction 28, relative movement between the boss and the slot is permitted. As shown in FIGS. 7 and 8, a radial dimension 68 of the slot is sized so as to have a loose fit with the boss. Preferably, a clearance gap 70 is provided between the slot and each radial side of the boss. Thus, when the mount is subjected to distortional loading, the bosses are free to move radially within the slots.

FIG. 9 provides a detailed view of the fastener connection of the race 20 and the mount 22. Preferably, the fastener 38 has a head 80 and an intermediate portion 82 that provides axial support and positioning for the race on the mount. As shown in FIG. 9, the fastener intermediate portion 82 has clearance with the race fastener hole 36. The fastener hole 36 may also be counter-bored and the counter-bore is sized sufficiently such that the fastener head 80 has clearance with the counter-bore. However, the fastener head 80 is large enough to allow the fastener to maintain axial positioning for the race on the mount. Thus, the fastener intermediate portion 82 engages the mount fastener hole boss 58 and the fastener head 80 engages the race and supports and positions the race on the mount against the pressure from the compression springs 64. This, along with the clearance between the fastener 38 and the surfaces of the fastener holes 36 provides a somewhat floating connection for the race when it is mounted to the mount.

As can be seen by the drawings and the above description, the bearing race is able to receive a bearing transfer load transferred from the mount, or vice versa, while allowing relative movement between the race and the mount in the radial direction, thereby preventing or at least substantially reducing the transfer of mount distortion to the race. Together, the clearances between the bosses 44 and the slots 34, between the fasteners 38 and the race fastener holes 36, and between the end surface 42 and the radial wall 32 allow for distortion of the mount without the distortion being transferred to the race. Because the race 20 has a floating connection with the mount 22, transfer of mount distortion to the race is substantially reduced.

Although the present invention shows the bearing race formed with slots and the mount formed with bosses, it should be appreciated that these elements may be reversed or interchanged depending upon the application; and therefore, this alternative is considered to be within the scope of the invention. Additionally, the bosses on the mounts are shown to be rectangular in shape so as to cooperate with the rectangular slots in the race. It should be understood that the bosses and slots may be each formed in a geometric shape which cooperates with the other in a manner to enable the bearing transfer load to be transferred from the mount to the bearing race in the transverse direction while allowing relative movement between the race and the mount in the radial direction.

As various changes could be made in the above constructions and methods without departing from the scope of the invention, it is intended that all matter contained in the above description or shown in the accompanying drawings shall be interpreted as illustrative and not in a limiting sense. The invention therefore shall be limited solely by the scope of the claims set forth below.

What is claimed is:

1. A combination comprising:
    a race for a bearing comprising an annular bearing surface extending about a bearing axis and a wall extending radially from the annular bearing surface;
    a mount for the bearing race comprising a center hub formed on the mount; and
    at least one slot being formed on one of the race wall and the hub, and at least one cooperating boss being formed on the other of the race wall and the hub, the slot and the boss extending in both radial and transverse directions relative to the bearing axis, the slot and boss engaging with each other in the transverse direction in a manner to transfer a bearing load between the mount and the bearing race, the slot cooperating with the boss to form a gap therebetween in the radial direction sufficient in dimension to allow relative movement between the slot and the boss in the radial direction as the mount is distortionally loaded and elastically deformed along the bearing axis.

2. The combination of claim 1 wherein the at least one slot is one of a plurality of slots and the at least one boss is one of a plurality of bosses.

3. The combination of claim 2, wherein the slots and bosses are equiangularly spaced.

4. The combination of claim 1 wherein the at least one slot is formed on the radial wall and the at least one boss is formed on the mount.

5. The combination of claim 1 wherein the at least one slot and the at least one boss are generally rectangular in shape.

6. The combination of claim 1, wherein the bearing race is the inner race of the bearing.

7. The combination of claim 1, wherein the bearing race radial wall extends radially inward from the annular bearing surface.

8. The combination of claim 1, wherein the annular bearing surface extends axially about a bearing race center axis.

9. The combination of claim 1, wherein the radial wall is axially centered relative to the annular bearing surface.

10. A combination comprising:
    a race for a bearing comprising an annular bearing surface extending about a bearing axis and a wall extending radially from the annular bearing surface;
    a mount for the bearing race comprising a center hub formed on the mount; and
    a plurality of slots formed on one of the race wall and the hub and a plurality of cooperating bosses formed on the other of the race wall and the hub, each of the slots and the bosses extending in both the radial and transverse directions relative to the bearing axis, the slots and bosses having a close fit in the transverse direction to allow a transfer of a bearing load between the mount and the bearing race, the slots and bosses having a loose fit in the radial direction such that the race bearing surface maintains its substantially annular shape independently of any load applied to the mount tending to cause elastic distortion of the mount along the bearing axis.

11. The combination of claim 10, wherein the bearing race is held in place with mechanical fasteners that engage the mount in the axial direction and provide axial positioning for the race in a spaced apart relationship with the mount, the mechanical fasteners have clearance with the race in both the radial and transverse directions.

12. The combination of claim 11, further comprising springs positioned between the race and the mount, the springs bias the race away from the mount when the race is mounted on the mount.

13. A bearing race and a mount combination for rotatably mounting a rotating member about a bearing axis, the rotating member being adapted to rotate about an axis perpendicular to the bearing axis wherein rotation of the rotating member about the perpendicular axis creates a centrifugal force so as to apply a load to the mount tending to elastically distort the mount along the bearing axis, the combination comprising:
    the bearing race comprising an annular bearing surface and a wall extending radially from the bearing surface, the wall comprising one of a plurality of slots and a plurality of cooperating bosses, and the mount comprising the other of the plurality of slots and the plurality of cooperating bosses, the slots and bosses extending in both the radial and transverse directions relative to the bearing axis, the slots and bosses engaging with each other in the transverse direction to allow a transfer of a bearing load between the mount and the bearing race, the slots being spaced and apart from the bosses in the radial direction to allow relative movement of the bearing race and the mount in a radial direction relative to the bearing axis as the rotating member is centrifugally loaded and elastically deformed along the bearing the bearing axis.

14. The combination of claim 13 wherein the rotating member is a helicopter rotor blade operatively connected to the mount.

15. The combination of claim 13 wherein the bearing race is held in place with mechanical fasteners that engage the mount in the axial direction and provide axial positioning for the race in a spaced apart relationship with the mount, the mechanical fasteners have clearance with the race in both the radial and transverse directions.

16. The combination of claim 15, further comprising springs positioned between the race and the mount, the springs bias the race away from the mount when the race is mounted on the mount.

* * * * *